Patented Aug. 13, 1940

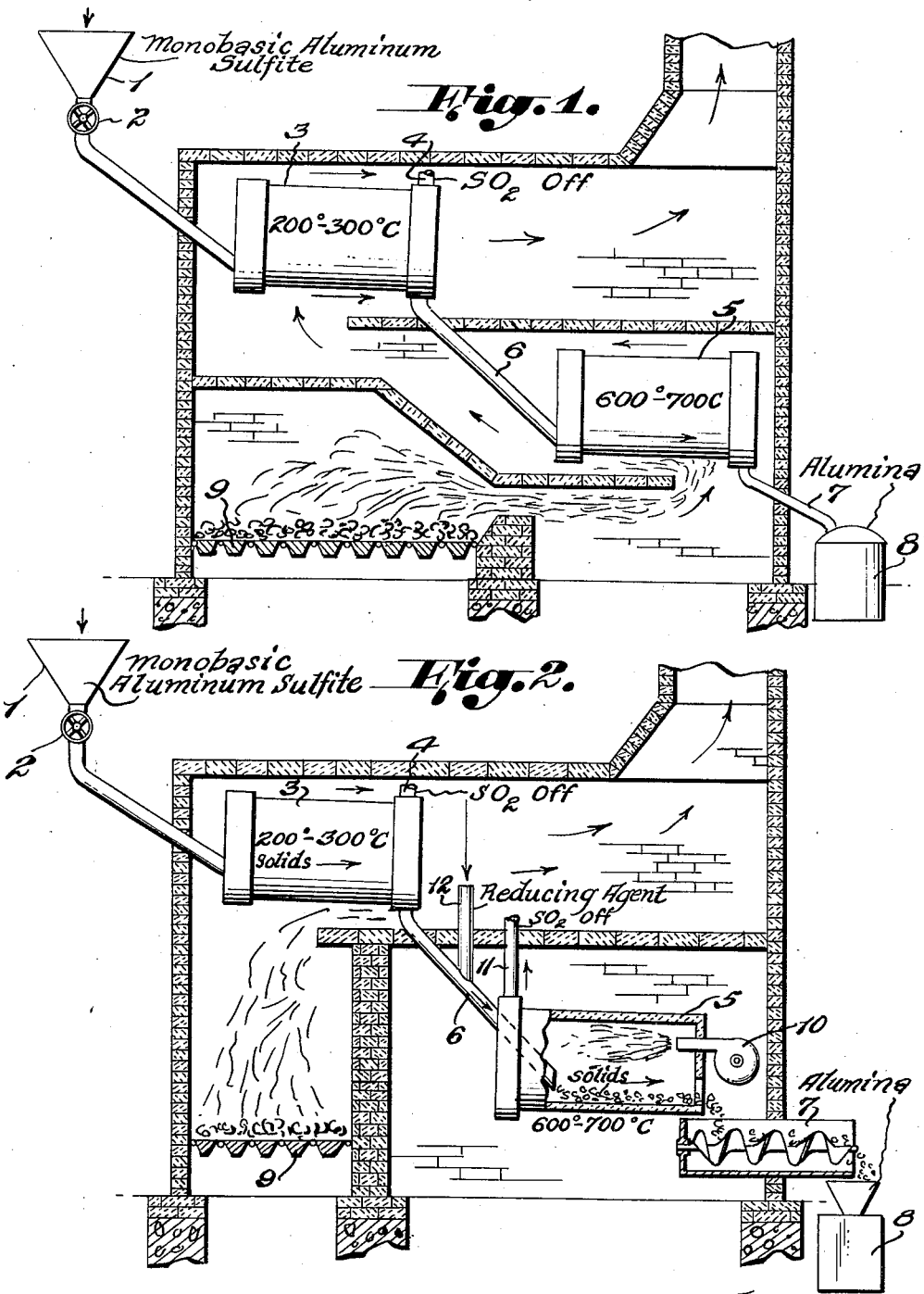

2,211,681

UNITED STATES PATENT OFFICE 2,211,681

MANUFACTURE OF HIGHLY REACTIVE ALUMINA

Erich Wiedbrauck, Essen-Bredeney, and Hans Ginsberg, Lautawerk (Lausitz), Germany, assignors of one-half to the firm of Th. Goldschmidt A.-G., Essen-Ruhr, Germany, and one-half to the firm Vereinigte Aluminum-Werke Aktiengesellschaft, Lautawerk (Lausitz), Germany Application October 31, 1938, Serial No. 238,101
In Germany November 3, 1937

5 Claims. (Cl. 23—141)

This invention relates to manufacture of highly reactive alumina; and it comprises a process of making a highly reactive alumina product from monobasic aluminum sulfite $$(Al_2O_3 \cdot 2SO \cdot xH_2O)$$

wherein the latter is calcined to drive off its $SO_2$ content at a temperature not exseeding 1000° C., the said calcination being conducted in a continuous manner and in two steps with recovery of the evolved $SO_2$; all as more fully hereinafter set forth and as claimed.

The recently developed sulfite extraction process, in which alumina is extracted from clay with sulfurous acid, has provided a source of aluminum sulfite liquor of rather high purity. It has recently been discovered that the aluminum sulfite liquors derived from this extraction process can be readily converted into a new compound, namely into monobasic aluminum sulfite. This latter product can be converted into a highly-reactive alumina of substantial purity provided that it is calcined under certain rather well-defined conditions.

When it is attempted to calcine monobasic aluminum sulfite by the usual batch calcining methods for the production of a highly-reactive alumina product, many difficulties are encountered. If the usual muffle furnace is employed, for example, and a charge of the sulfite is heated to calcination temperatures it has been found that the $SO_2$ is evolved very vigorously, even at temperatures as low as 200° C. and that a nonuniform and poorly reactive product results, even though the furnace temperature is raised very slowly. There is also a considerable loss of alumina as dust in the evolved $SO_2$. This dust is difficult to remove and causes technical difficulties. If agitation is used in the furnace but little improvement results. We have discovered that these difficulties are due to the inevitable overheating of the product which takes place in this type of furnace owing to the low heat conductivity of the calcination product and to the long exposure of the calcination product to maximum furnace temperatures. We have found that the temperature of the calcination product should not exceed 1000° C. as a maximum, if a highly-reactive product is to be obtained and that the time of exposure of the calcination product to maximum furnace temperatures should be as short as possible. But even though constant agitation is employed as well as careful control of temperature it is extremely difficult to obtain a satisfactory product by the batch method of calcination. Moreover the time consumed in this process makes it uneconomical.

We have found that much better results can be obtained when use is made of a continuous calcination process in which the monobasic aluminum sulfite is introduced continuously into one end of a furnace and passed to the discharge end continuously either by means of rabbles or by the rotation of the furnace. The temperature of the product should be raised rather slowly at the start until the bulk of the $SO_2$ has been evolved and the furnace should be designed and heated in such manner that the exposure of the calcination product to maximum furnace temperatures is as short as possible and occurs just before the product is removed from the furnace, in order that rapid cooling of the product can be effected. When conducted in this manner the unreacted monobasic aluminum sulfite is intimately mixed with and diluted by alumina already formed by the calcination. This reduces the violence of the evolution of the $SO_2$ and the formation of alumina dust is substantially reduced.

It is possible to conduct the above described continuous process in a muffle furnace furnished with rabbles provided that these rabbles are designed to move the product from a charging point to a discharge point through a zone of gradually increasing temperatures. The process can also be conducted in a rotary furnace and this has the advantage that the calcined material can be passed through the hottest zone in a thin layer and as quickly as possible. It is possible by this continuous process to obtain an adequately calcined, homogeneous product which is free from over-heated material and which is highly reactive and readily soluble in dilute caustic lye.

It is advantageous to heat the furnace which is employed in our process externally in order that the $SO_2$ which is evolved during calcination can be recovered in substantially pure form uncontaminated by flue gases. The conventional electric furnace or externally heated rotary furnace can be employed, for example, these furnaces being made substantially air tight. It is possible to employ reduced pressure in the furnace which assists in the decomposition and reduces the temperature required. Owing to the high maximum temperatures which must be employed during the last stages of the process, for example temperatures ranging from about 600° to 700° C., it is necessary to have at least part of the furnace constructed from expensive refractory materials which are resistant to $SO_2$, which are capable of withstanding these temperatures and which are also good heat conductors.

We have found it highly advantageous to divide the process into at least two separate stages, in the first stage of which the monobasic aluminum sulfite is heated to maximum temperatures ranging from about 200° to 300° C., the bulk of the $SO_2$ being driven off in this stage. This initial stage of our process may be conducted in a furnace of conventional and cheap construction, for example wrought iron furnaces can be employed in this stage. In the second stage of this process it is necessary for the temperature to be raised to a maximum of about 600° to 700° C. and it is evident that the furnace employed in this stage must be constructed of more expensive refractory materials. But it is possible to employ a much smaller furnace in this second stage since only one-third of the total energy required to be supplied in the process is consumed during this final heating stage. It is thereby possible to effect a substantial over-all saving in construction costs of the furnace equipment.

Our two-stage process has the further advantage of permitting the use of reducing agents in the final stage only of the process. The presence of reducing agents in the reaction zone is advantageous in that the formation of $SO_3$ is prevented and the decomposition temperature is lowered. If such agents are added in the initial stage of the process a considerable part of their effectiveness is lost by volatilization or chemical reaction before the high temperature zone is reached and therefore their reducing action is required. But in our two-stage reaction it is possible to add these reducing agents at the start of the second or high temperature stage. Gases such as hydrogen or carbon monoxide can be used, or solids such as carbon, or other materials which evolve reducing gases under the conditions of the reaction. When these reducing agents are introduced in the second stage of the process, it is also possible to prevent contamination of the $SO_2$ evolved in the first stage by these reducing agents. Therefore 60 to 70 per cent of the total evolved $SO_2$ can be recovered in substantially pure form.

There is still another important advantage derived by conducting our process in two stages. We have found that, in the single stage process, operating difficulties are encountered whether the evolved $SO_2$ is led off at the forward or the rear end of the furnace, and whether the combustion gases are passed in parallel flow or in counter-current flow to the flow of solids in the furnace. If parallel flow is employed, the calcination product is heated quickly by the hot gases and therefore tends to remain too long at the maximum furnace temperatures. Quick cooling of the final product, after reaching maximum temperatures, is prevented. But if counter-current flow is employed, it has been found that corrosion difficulties are caused at the forward end of the furnace owing to the condensation of the steam at this point. This condensed steam dissolves the $SO_2$ and the resulting sulfurous acid is highly corrosive toward iron equipment, for example. The steam is derived from the charge of monobasic aluminum sulfite which is conveniently charged to the furnace in moist condition and which in any case contains some extraneous moisture. This moisture also causes considerable caking of the charge and incrustation of the furnace. Frequent shut-downs are necessary in order to clean the forward end of furnaces operated by this counter-current method.

The above mentioned difficulties can be completely eliminated by the use of our two-stage process. In this process we advantageously employ parallel flow in the first stage and counter-current flow in the second stage. By this means condensation of steam and incrustation of the apparatus at the forward end are prevented and it is possible to cool the final product quickly at the rear end owing to the counter-current flow of combustion gas and solids at this point. The time during which the product is subjected to maximum furnace temperatures is substantially shortened.

In our two-stage process it is also possible to employ direct heating of the furnace in the second stage and indirect heating in the first stage. If this is done it is advantageous to collect the $SO_2$ evolved in the two stages separately. The bulk of the gases are evolved in the first stage and these gases can be recovered in substantially pure form. But in the second stage it frequently happens that the advantages gained by direct heating more than counterbalance the disadvantages resulting from dilution of the $SO_2$ evolved in this stage by combustion gases. This is true, for example, when the process is conducted in the usual alumina plant being equipped with apparatus designed for the recovery of $SO_2$ from gases of low $SO_2$ content. If direct heating is employed in the second stage of our process we have found that the resulting gases contain $SO_2$ in the proportions of about 6 to 10 per cent by volume and this $SO_2$ can be recovered economically by conventional methods. Direct heating in the second stage of our process can be accomplished by gas or oil, for example, and this has the advantage that the construction of the furnace used in this stage is considerably simplified. The furnace required is less expensive and the efficiency of the heating is considerably increased. The conventional type of rotary furnace can be used, for example.

When our two stage or two-step process is employed it is convenient to employ a substantially air-tight muffle or rotary furnace in the first stage provided with a vent for the $SO_2$ at its rear end. This furnace is connected, by means of a covered passageway for solids, with a second furnace which may be of the rotary type and either internally or externally heated, this furnace being provided with a vent for the $SO_2$ at its charging end. If both furnaces are operated with exclusion of air the $SO_2$ can be withdrawn from a common vent located in the passageway between the furnaces. The furnace employed in the second stage should also be provided with a passageway through which a reducing agent in gaseous or solid form may be fed. If the reducing agent is a solid it must be introduced at the charging end of this furnace whereas, if it is a gas, it must be introduced at the discharge end. If the furnace employed in the second stage is internally fired the reducing agent can be mixed with the fuel or the flue gases themselves may serve as a reducing agent provided that the fuel is supplied with oxygen which is sufficient to produce partial combustion only.

Our invention can be understood readily by referring to the accompanying drawing whose figures illustrate diagrammatically two embodiments of our process. In this showing, Fig. 1 represents our continuous process as conducted with two rotary furnaces both of which are indirectly heated, while Fig. 2 illustrates our process as conducted with rotary furnaces the first of which is heated indirectly while the second is heated internally.

In the drawing like elements are designated by like reference numerals. The processes which are illustrated in the two figures are believed to be evident from the descriptive legends on the drawing. The aluminum sulfite which is to be calcined is passed through the hopper 1 in both cases, being fed by the star wheel 2 into the charging end of the first rotary furnace 3. This furnace is substantially air tight in both embodiments and the sulfite is heated to temperatures within the range of about 200° to 300° C. Sulfur dioxide is withdrawn in substantially pure form from the discharge end through the pipe 4, while the partly calcined sulfite is passed through pipe 6 into the second rotary furnace 5, which is smaller in size and constructed usually of refractory material. In this second furnace the charge of sulfite is heated to maximum temperatures usually within the range of 600° to 700° C. which is sufficiently high to drive off all the remaining $SO_2$ leaving a substantially pure and reactive alumina which is discharged through 7 into receiver 8.

In the embodiment of Fig. 1 the second rotary furnace is substantially air tight and is heated externally. The $SO_2$ gas evolved from this furnace passes upwardly through the pipe 6 and is withdrawn, in admixture with the $SO_2$ from furnace 3, through pipe 4. Both of the rotary furnaces are heated by combustion gases from the furnace 9 and it is evident, from the arrows which show the course of these gases that the charging end of furnace 3 is heated to a higher temperature than the discharge end while the reverse is true in the case of furnace 5. The charge in the second furnace is heated to maximum temperatures just before passing out of the furnace.

The embodiment shown in Fig. 2 differs from that shown in Fig. 1 primarily by the fact that the second furnace 5 is heated directly by means such as the oil burner 10. The combustion gases pass through the furnace in contact with the charge and are withdrawn through the pipe 11. In this embodiment a solid reducing agent may be introduced into the second furnace by means of the pipe 12. The furnace 9 in this embodiment is used for heating the first furnace only.

The following specific examples represent practical embodiments of our process as conducted in actual practice.

Example 1

In this example a muffle furnace was employed which was provided with a slowly operating rabble mechanism. This furnace was charged with 5000 kilograms of moist monobasic aluminum sulfite containing 27 per cent of $Al_2O_3$. The furnace was heated rather quickly to a temperature of about 150° C. and then the rate of heating was reduced to such an extent that a temperature of 300° C. was reached only after an additional 6 hours heating. This slow rate of heating was continued until the temperature reached 600° C. when the heating was discontinued. The $SO_2$ evolved was drawn off through a ventilator. About 1530 kilograms of $SO_2$ were recovered as 100 per cent by volume gas during this calcination. This gas, however, was found to carry 10 per cent of the alumina present in the form of a fine dust. The final calcined product obtained was found to weigh 1460 kilograms and to have the following analysis:

|  | Per cent |
|---|---|
| $Al_2O_3$ | 84.0 |
| $SO_2$ | 3.5 |
| $SO_3$ | 7.5 |
| $H_2O$ | 5.0 |

The solubility of this product in 10 per cent soda lye at a temperature of 80° C. was found to be 88 per cent. It was noted that portions of this product had been overburned.

Example 2

In this example an externally heated revolving furnace of heat resistant steel was employed operating on the counter-current principle, that is with a counter-current flow of combustion gases and solids. This furnace was charged with 1000 kilograms per hour of moist monobasic aluminum sulfite containing 27 per cent of $Al_2O_3$. The time of passage of the material through the furnace was about 45 minutes. Just before passing out of the furnace the product was heated to a temperature of 600° C. 325 kilograms of 100 per cent by volume $SO_2$ were drawn off per hour through a vent. It was found that only 1 per cent of the alumina present was carried away by the gases. A highly reactive alumina product was discharged from the furnace at the rate of about 300 kilograms per hour. This product had the following analysis:

|  | Per cent |
|---|---|
| $Al_2O_3$ | 90.5 |
| $SO_2$ | 0.5 |
| $SO_3$ | 4.0 |
| $H_2O$ | 5.0 |

The solubility of the final product in 10 per cent soda lye at a temperature of 80° C. was found to be 99.5 per cent. No overburned material was present. This example shows the superior results obtained when the reaction material is heated to maximum furnace temperatures for a very short period only and when counter-current flow is employed.

Example 3

In this example our two-stage process was employed, the monobasic aluminum sulfite being charged into a first furnace which was of the rotary type, heated externally to a maximum temperature of about 250° C. and constructed of wrought iron, the solid product from this furnace being then passed with exclusion of air into a second smaller furnace of the rotary type, heated externally to a maximum temperature of about 600° C. at a point just before its exit and constructed of heat resistant steel. The first furnace was operated with parallel flow of cumbustion gases and solids while the second was operated in counter-current flow. The first furnace was charged with 1000 kilograms per hour of moist monobasic aluminum sulfite containing 27 per cent of $Al_2O_3$. The gases recovered from the first furnace contained, in addition to steam, 220 kilograms per hour of $SO_2$. The partially calcined material discharged from this furnace was found to contain about 57 per cent of $Al_2O_3$ and 25 per cent of $SO_2$. From the second furnace there were recovered about 105 kilograms per hour of $SO_2$. This gas was drawn off together with the gases from the first furnace at a common flue located between the two furnaces. The time of retention of the solids in the first furnace was about 30 minutes and in the second 15 minutes. The calcined product recovered amounted to 300 kilograms per hour, this product having the following analysis:

| | Per cent |
|---|---|
| $Al_2O_3$ | 91.0 |
| $SO_2$ | 0.5 |
| $SO_3$ | 3.5 |
| $H_2O$ | 5.0 |

The dust loss in this process amounted to about 1.0 per cent. The solubility of the product in 10 per cent soda lye at a temperature of 80° C. was found to be substantially complete. This example shows the superior results obtained with our two-stage process. In addition to the improved product which was obtained, no difficulties were encountered in the two-stage process from corrosion or from incrustation of the furnaces.

While we have described what we consider to be the more advantageous embodiments of our invention it is evident that various modifications can be made in the procedures described without departing from the purview of the invention. It is obvious, for example, that furnaces of various types and constructed of various materials can be employed in our process. The process can be conducted with or without the use of reducing agents. Various methods may be used for the recovery of the $SO_2$ evolved, for the separation of the dust and for the cooling and collection of the highly-reactive alumina product. Other modifications which fall within the scope of the following claims will be immediately evident to those skilled in this art.

What we claim is:

1. In the manufacture of a highly-reactive alumina, the process which comprises continuously passing monobasic aluminum sulfite through two separate calcination zones, heating it indirectly with substantial exclusion of air in the first of said zones to temperatures sufficient to produce the evolution of the bulk of the $SO_2$ from the sulfite and collecting said $SO_2$ in substantially pure form, passing the resulting partially calcined sulfite into the second of said zones, heating it directly immediately before passing out of said zone to higher maximum temperatures not substantially exceeding 700° C. whereby the product is subjected to maximum furnace temperatures for a minimum period only without overburning the resulting alumina and collecting the evolved $SO_2$ admixed with combustion gases from said second zone.

2. In the manufacture of a highly-reactive alumina, the process which comprises continuously passing monobasic aluminum sulfite through two calcination zones connected in series, heating said sulfite indirectly in the first of said zones to maximum temperatures not substantially exceeding 300° C. whereby the bulk of the $SO_2$ in said sulfite is evolved, passing the partially calcined product into the second calcination zone, heating it indirectly in said zone in such manner that it reaches higher maximum temperatures not substantially exceeding 700° C. immediately before passing out of said second zone whereby the product is subjected to maximum furnace temperatures for a minimum period only without overburning.

3. The process of claim 2 wherein the $SO_2$ evolved from said calcination zones is collected at a point between said zones.

4. In the manufacture of a highly-reactive alumina, the process which comprises continuously passing monobasic aluminum sulfite through two calcination zones connected in series, heating said sulfite indirectly with substantial exclusion of air in the first of said zones to temperatures producing the evolution of the bulk of the $SO_2$ and collecting the so-evolved $SO_2$ in substantially pure form, then passing the resulting partially calcined product into the second of said zones, heating it in the presence of a reducing agent to higher maximum temperatures not substantially exceeding 700° C. immediately before passing out of said second zone, whereby the product is subjected to maximum furnace temperatures for a minimum period only without overburning, and collecting the $SO_2$ evolved in said zone.

5. In the manufacture of a highly-reactive alumina, the process which comprises continuously passing monobasic aluminum sulfite through a rotary furnace wherein it is heated indirectly to maximum temperatures within the range of about 200° to 300° C., whereby the bulk of the $SO_2$ in the sulfite is evolved, then passing the partially calcined sulfite into and through a second rotary furnace of substantially smaller size constructed of refractory materials, heating it to maximum temperatures within the range of about 600° to 700° C. just before passing out of said second furnace whereby the calcination product is subjected to maximum furnace temperatures for a minimum period only and the $SO_2$ is substantially eliminated without the overheating of the resulting alumina.

ERICH WIEDBRAUCK.
HANS GINSBERG.